US008075847B2

(12) United States Patent
Zettlitzer et al.

(10) Patent No.: US 8,075,847 B2
(45) Date of Patent: Dec. 13, 2011

(54) DETERGENT DISPENSER

(75) Inventors: Günther Zettlitzer, Bergen (DE); Ralf Heiduczek, Bischofswiesen (DE)

(73) Assignee: Ecolab USA Inc., St. Paul, MN (US)

( * ) Notice: Subject to any disclaimer, the term of this patent is extended or adjusted under 35 U.S.C. 154(b) by 514 days.

(21) Appl. No.: 11/720,924

(22) PCT Filed: Dec. 9, 2004

(86) PCT No.: PCT/EP2004/014028

§ 371 (c)(1), (2), (4) Date: Jun. 28, 2007

(87) PCT Pub. No.: WO2006/061041

PCT Pub. Date: Jun. 15, 2006

(65) Prior Publication Data

US 2008/0107576 A1 May 8, 2008

(51) Int. Cl.
*B01D 12/00* (2006.01)
*D06F 35/00* (2006.01)

(52) U.S. Cl. ........................................ 422/266; 68/17 R

(58) Field of Classification Search .................. 422/266; 68/17 R

See application file for complete search history.

(56) References Cited

U.S. PATENT DOCUMENTS

| | | | | |
|---|---|---|---|---|
| 4,248,398 | A * | 2/1981 | Doyel | 248/220.1 |
| 5,234,268 | A * | 8/1993 | Homan | 366/160.4 |
| 5,282,901 | A * | 2/1994 | Reinhard | 134/18 |
| 5,417,233 | A * | 5/1995 | Thomas et al. | 134/93 |
| 5,464,125 | A * | 11/1995 | Daansen | 222/156 |
| 5,782,109 | A | 7/1998 | Spriggs et al. | |
| 6,109,480 | A * | 8/2000 | Monsrud et al. | 222/83 |
| 6,143,257 | A * | 11/2000 | Spriggs et al. | 422/264 |
| 6,857,439 | B1 * | 2/2005 | Perruca et al. | 134/113 |
| 2003/0168085 | A1 * | 9/2003 | Sowle et al. | 134/25.2 |
| 2004/0226961 | A1 * | 11/2004 | Mehus et al. | 222/77 |
| 2005/0023290 | A1 * | 2/2005 | Kon et al. | 222/39 |

FOREIGN PATENT DOCUMENTS

| | | |
|---|---|---|
| EP | 0781110 | 7/1997 |

* cited by examiner

*Primary Examiner* — Kevin Joyner
(74) *Attorney, Agent, or Firm* — Merchant & Gould P.C.

(57) ABSTRACT

The invention relates to a detergent dispenser for dosing a quantity of solid detergent by dissolving some of the solid detergent in a liquid solvent, in particular in water, to form a detergent solution, and feeding the detergent solution to a detergent outlet. The dispenser comprises a housing (1) with a chassis (2) for wallmounting or the like and a solid detergent reservoir (3). The solid detergent reservoir (3) comprises a detergent compartment (4) holding the solid detergent, a solvent application compartment (7), a liquid solvent dispensing means (9), a solvent supply conduit (10) leading to the solvent dispensing means (9), a detergent solution collector means (11), and a solution conduit (12) connected to the detergent solution collector means (11) to carry away the detergent solution towards a detergent outlet. The invention is particularly convenient, because the solid detergent reservoir (3) is constructed as a modular unit easily separable from the housing (1). If different solid detergent reservoirs (3) for different types of solid detergent are provided, those are, even if they are different in the detergent compartment (4) and/or the solvent application compartment (7) and/or the liquid solvent dispensing means (9), fully compatible with the housing (1) as far as form and attachment points are concerned.

22 Claims, 16 Drawing Sheets

DETERGENT DISPENSER

This invention relates to a detergent dispenser for dosing a quantity of solid detergent by dissolving some of the solid detergent in a liquid solvent, in particular water, to form a detergent solution, and feeding the detergent solution to a detergent outlet and, finally, to a utilization point. In particular a detergent dispenser with the features of the preamble of claim 1 is the subject matter of this invention.

Dosing of a detergent from a detergent reservoir to achieve a detergent solution is widely accepted practice. To provide a detergent solution that is ready to use by dissolving some of a solid detergent stock material has a number of advantages as compared to using liquid detergent right from the beginning. For the background of the invention and in particular for the background of using a stock of solid detergent in a detergent dispenser reference is made to U.S. Pat. No. 5,549,875 A, the content of which is herewith incorporated into the present application by reference. There are aspects of product safety, shelf life, volume and costs related to the use of a solid detergent stock material.

A further prior art related to dosing of a solid detergent is EP 0 229 038 A (U.S. Pat. No. 4,964,185 A and U.S. Pat. No. 4,858,449 A) in the ownership of the applicant. The content of this prior art document is incorporated into the present application by reference, too.

The term "solid detergent" within the scope of the present invention means bulk material like powder or granulate as well as solid block-like material which may be produced by pressing of a powder, by casting, or even by extrusion or other manufacturing methods. Solid detergent within the scope of the present invention, however, shall as well cover semi-solid material like a gel with high viscosity which will not flow from the solid detergent reservoir on its own motion, but only if pre-dissolved in part by a liquid solvent.

The term "liquid solvent" shall cover all kinds of liquid able to form a solution with the solid detergent product. However, the liquid solvent will primarily be water. Water is not restricted to water at room temperature but may well be water at high temperature, e.g. hot water of about 40 to 80° C.

The term "detergent" in the present patent application means any kind of cleaning product for dish washing, laundry washing, rinsing or cleaning. However, the present detergent dispenser is primarily adapted for use in large industrial dish washing equipment and, also, laundry washing equipment.

The specific prior art forming the starting point of the invention (EP 0 781 110 B1, in the ownership of the applicant of the present patent application), discloses a detergent dispenser for dosing a quantity of solid detergent that is to be used in industrial dish washing machines. Dosing the necessary quantity of solid detergent by dissolving some of the solid detergent in a liquid solvent, namely in cold or hot water, to form a detergent solution, and feeding the detergent solution to a detergent outlet and, finally, to a utilization point, namely the dish washing machine.

This prior art detergent dispenser comprises a housing with a chassis for wall-mounting. The chassis is part of the housing. All parts of the housing are connected to each other by welding or screw-connections. Part of the housing also is a solid detergent reservoir forming a detergent compartment holding the solid detergent and a solvent application compartment below the detergent compartment. The two compartments are separated by a convex screen. A liquid solvent dispensing means in the form of a spray nozzle or spray nozzles is positioned within the solvent application compartment, and a solvent supply conduit leads to this solvent dispensing means from a solvent supply line. A detergent solution collector means is defined by a conical section of the solvent application compartment at the bottom thereof A solution conduit leads from the collector means downwardly towards a detergent outlet to carry away the detergent solution dripping off from the screen.

Upstream of the liquid solvent dispensing means there is provided a backflow preventer which serves to prevent any backflow of liquid into the external liquid solvent supply line (water mains) in case of a pressure drop in this external supply line. This backflow preventer is fixedly mounted within the housing and hydraulically connected by means of screw connections between the liquid solvent dispensing means and a motorized liquid solvent supply valve.

Operation of the prior art detergent dispenser is done by an electronic control unit which is not described in detail here.

The detergent dispenser disclosed in this prior art document is constructed for use with a solid detergent provided as bulk material (powder) in a bag. The detergent compartment of the solid detergent reservoir in the housing is provided with pointed blades for opening the bag from below. In order to remove an empty bag and insert a new bag filled with bulk material the detergent compartment is open at the top and has a cross-section adapted to the cross-section of the bag to be used with this detergent dispenser.

For each type of solid detergent a different detergent dispenser is available, in spite of the fact that all detergent dispensers for dosing solid detergents in the end have to meet more or less the same technical requirements. The result is small production quantities and high costs for stock capacity. Moreover, a customer who uses for example a prior art detergent dispenser for powder bulk material in bags has to exchange the complete detergent dispenser if he wants to use state of the art geo extruded solid block-like material.

Altogether, the object of the present invention is to provide a detergent dispenser as described above in general that provides advantages as far as manufacturing, flexibility and costs are concerned.

The present invention solves above mentioned problem with a detergent dispenser with the features of the preamble of claim 1 that is further specified by the features of the characterizing part of claim 1.

In the detergent dispenser according to the present invention the solid detergent reservoir is not an integral part of the housing but is constructed as a modular unit that is easily separable from the housing. If solid detergent reservoirs for different types of solid detergent are provided those can be different, but should be different only in the detergent compartment and, optionally, the solvent application compartment and/or the liquid solvent dispensing means. However, they are otherwise fully compatible with the housing and can be replaced one against the other as the need be. The customer can simply replace a reservoir for bulk powder material in bags by a different reservoir for solid-block material, or may replace one reservoir for solid block-like material produced by pressing of a powder by a different reservoir with different cross section adapted to e.g. an extruded block-like material (geo-material). In fact, there is only one type of detergent dispenser for all types of solid detergent. Due to the different detergent reservoirs which can be removed and re-fitted with the housing of the detergent dispenser, each type of solid detergent will be handled properly.

The basic idea of the present invention provides a large number of options for further improvement. So preferred embodiments are the subject matter of the dependent claims.

In general, the present invention is primarily intended for use with industrial dish washing machines or machines with the use of cold or hot water as liquid solvent and a solid detergent for the main washing cycle of the dish washing machine. However, in general, the idea can be applied for detergent dispensers of any kind, e.g. for laundry washing machines and cleaning machines for cleaning or disinfecting other items as well.

Further, as explained above already, the solid detergent may be provided as cast powder in a powder bag, as a granulate in a corresponding container or even as a semi-solid detergent, namely a gel with high viscosity, preferably in a suitable container as well. In the embodiment described here, however, the solid detergent is primarily provided as a solid block, sometimes also in a suitable container or plastic cover.

In general, the method for dissolving solid detergent from the solid detergent reservoir is well known from the prior art described above. In this method liquid solvent is sprayed towards the solid detergent in the solid detergent reservoir impinging upon substantially the entire lower surface area of the solid detergent. Detergent solution is dripping off the lower surface of the solid detergent in the reservoir and is collected for further feeding towards the utilization point. The detergent solution may me gravity-fed to the utilization point. However, this can be done by a delivery pump, too.

Along with an explanation of the drawings in detail the inventive detergent dispenser will be explained hereafter. All embodiments described in the sub-claims will be explained in detail hereafter as well:

FIG. 1 shows in a perspective view a detergent dispenser according to the invention for use with bulk material.

FIG. 2. shows in a perspective view a detergent dispenser according to the invention for use with block-like cast material.

Figure 10:
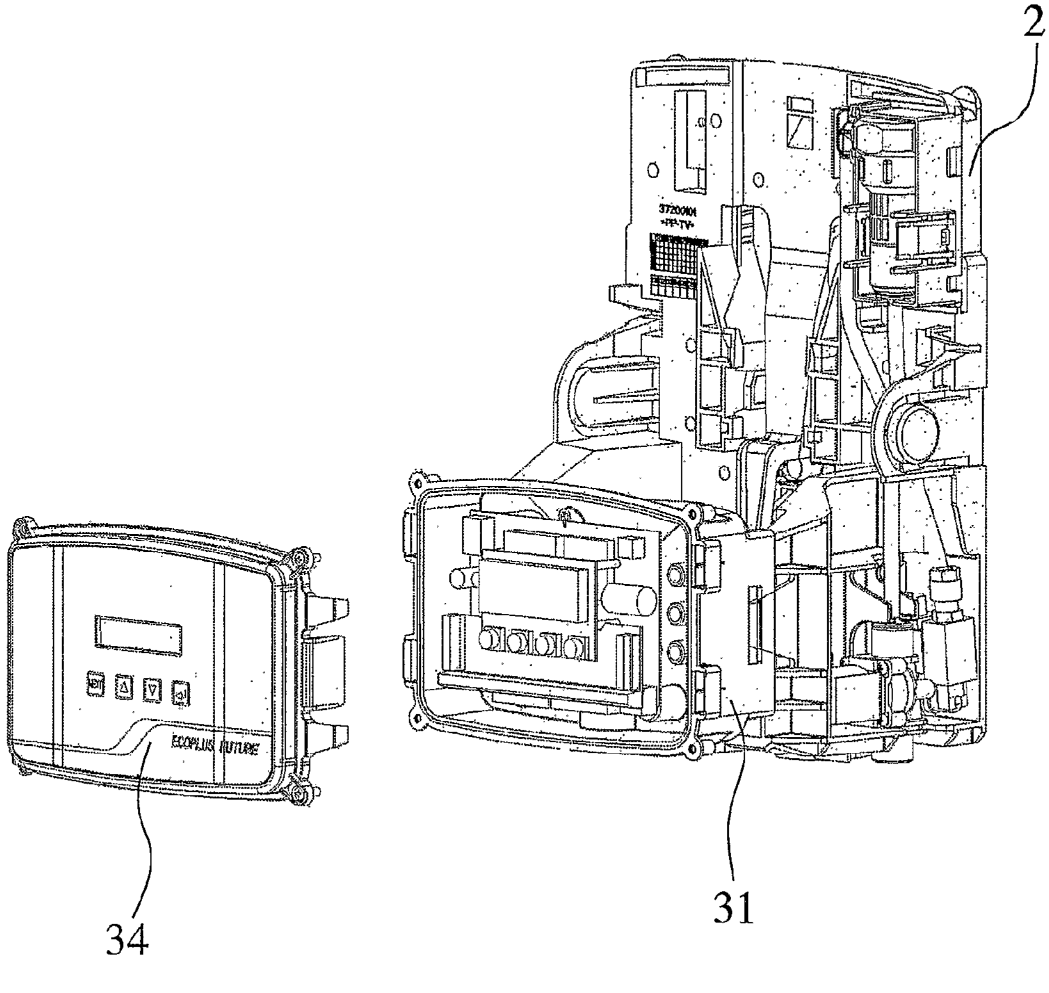

FIG. 10. shows in a perspective view the chassis with a cover for an electronic control unit removed.

Figure 11:
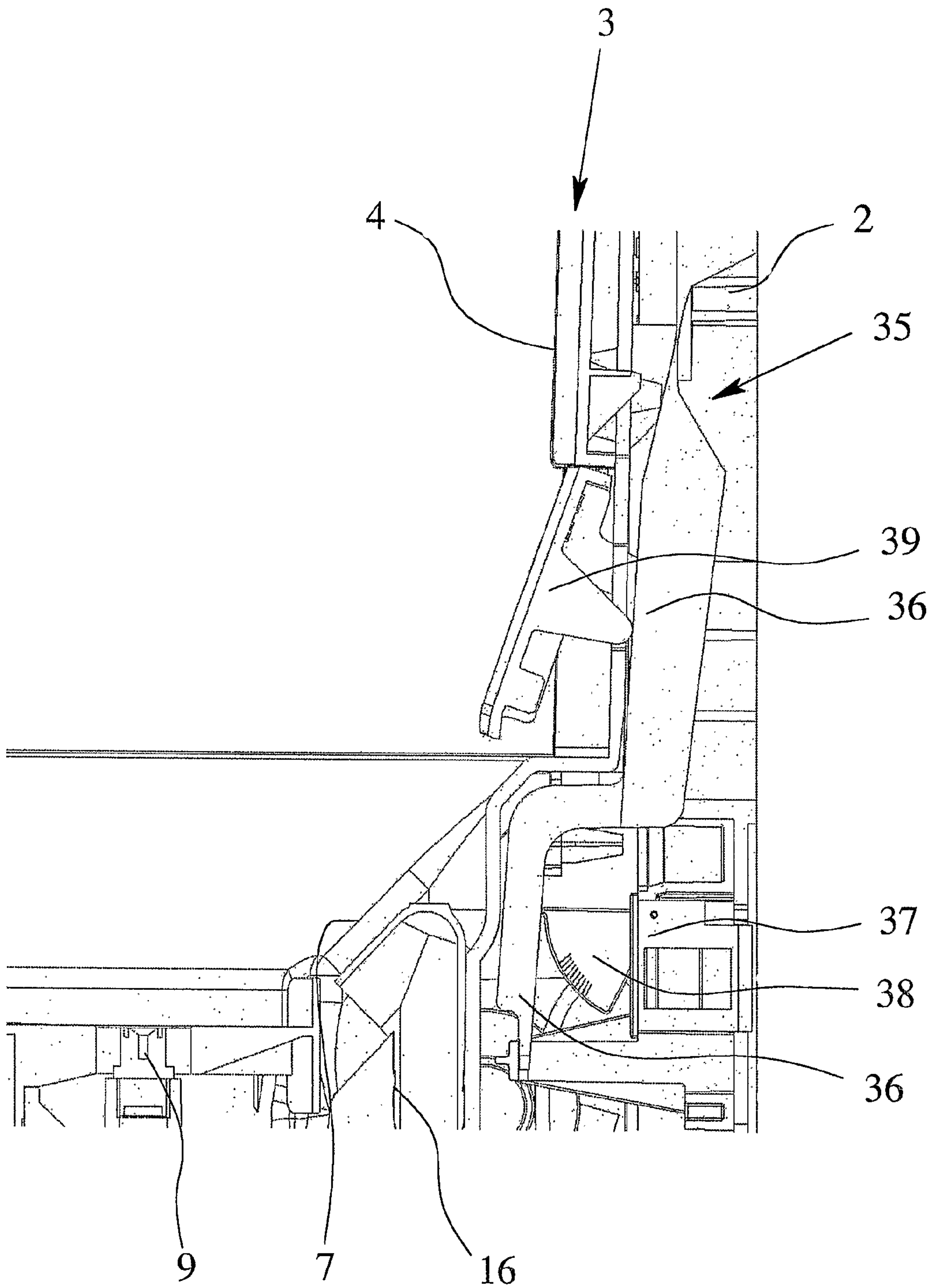

FIG. 11 shows an enlarged and sectional view of a safety switching means, the detergent reservoir mounted, but no solid detergent cartridge or container therein.

Figure 12:
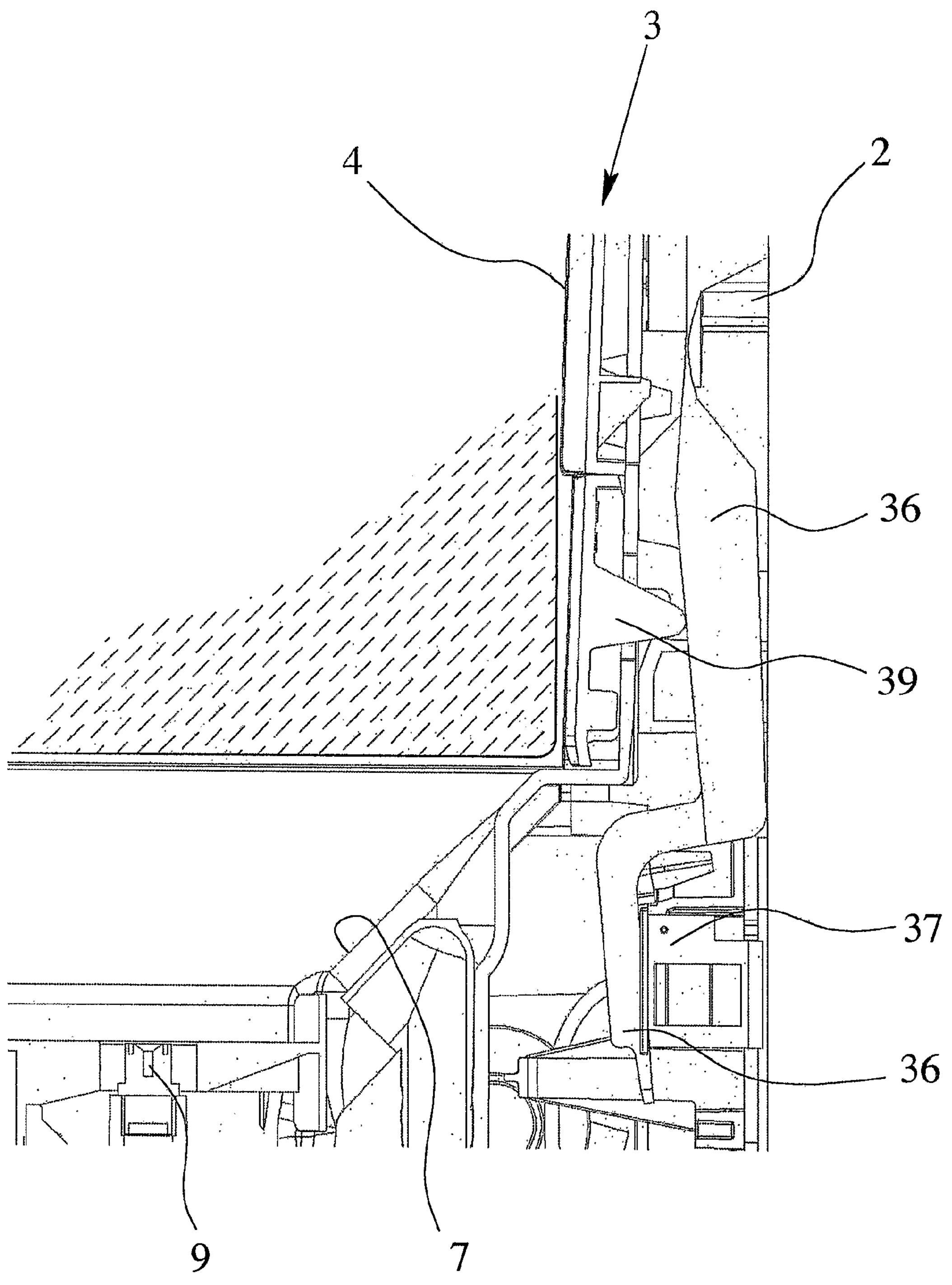

FIG. 12 shows the same section as FIG. 11, now the position when a solid detergent cartridge or container is positioned within the solid detergent reservoir.

Figure 13:
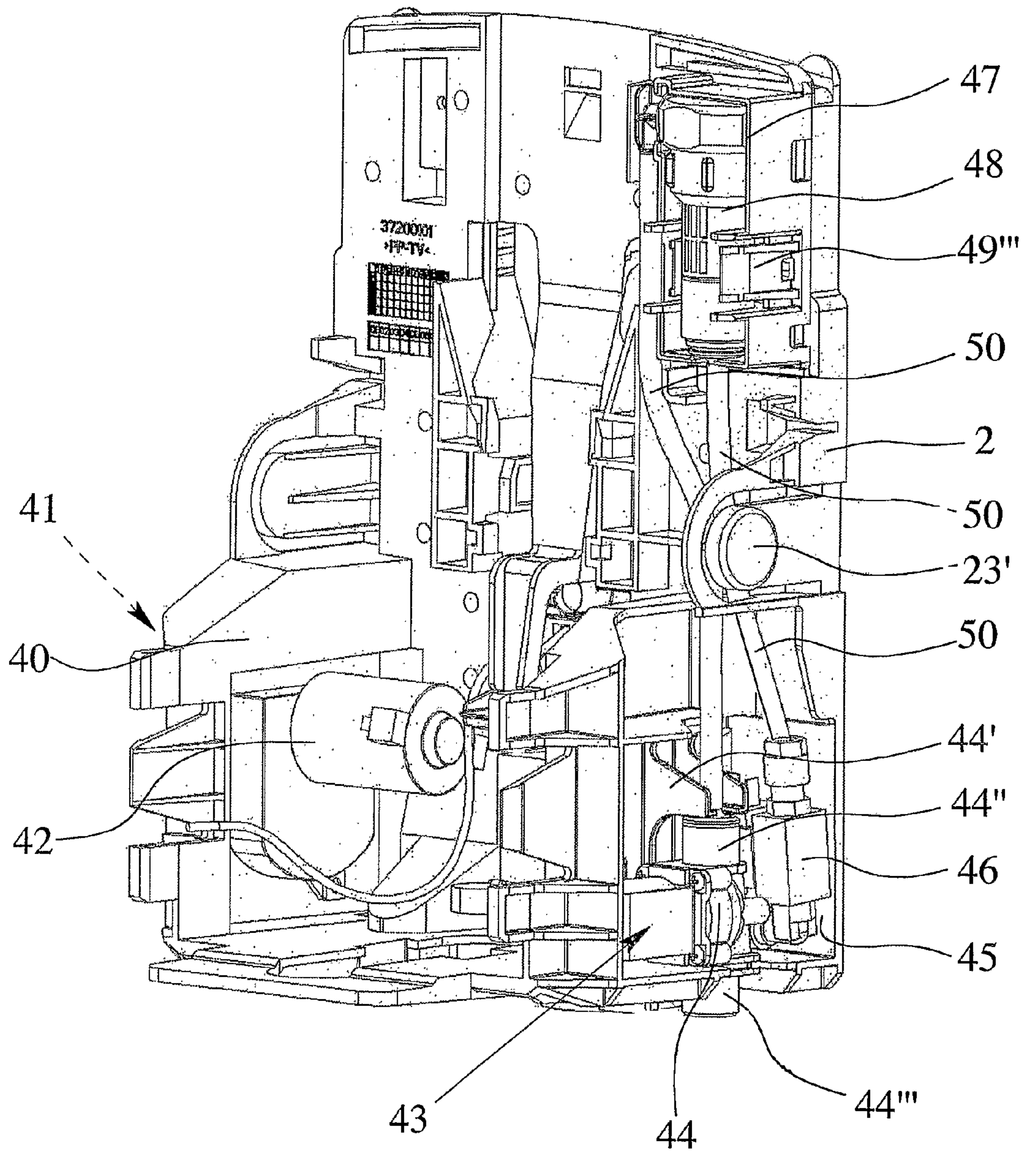

FIG. 13 shows the chassis of a preferred embodiment of the detergent dispenser, the electronic control unit removed.

Figure 14:
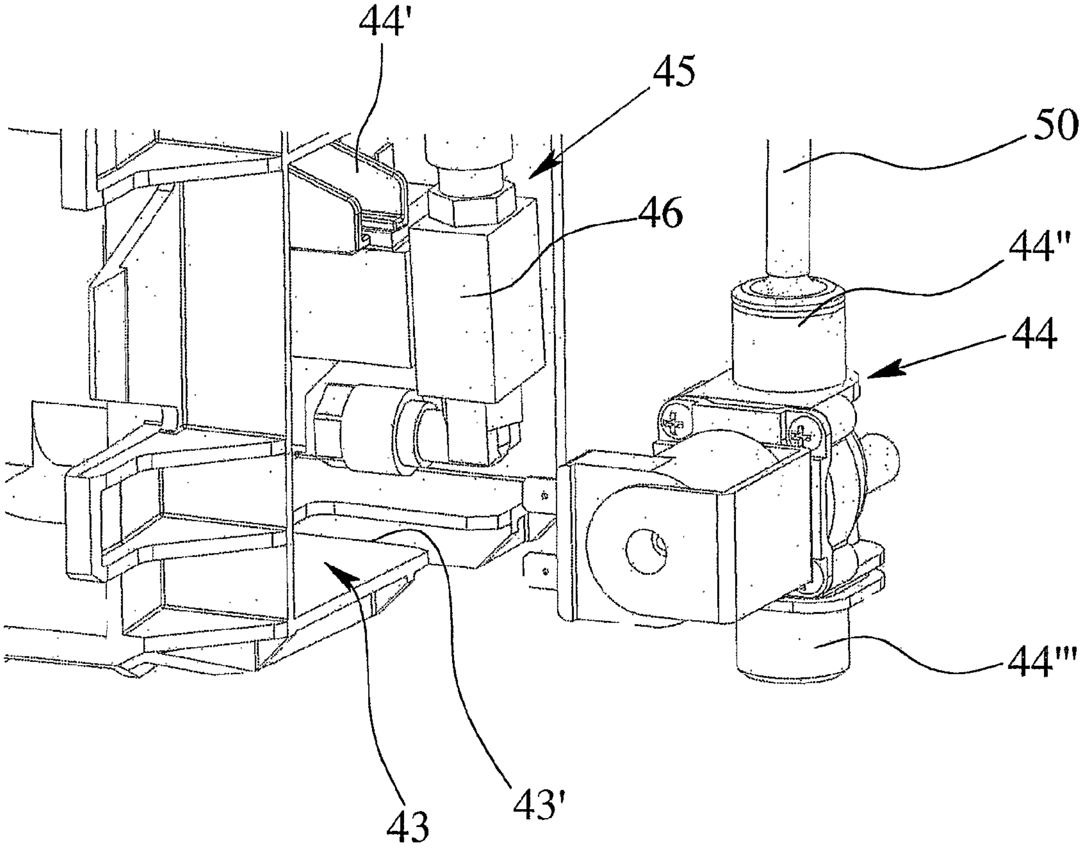

FIG. 14 shows an enlarged view of the lower right area of the chassis of FIG. 13.

Figure 15:
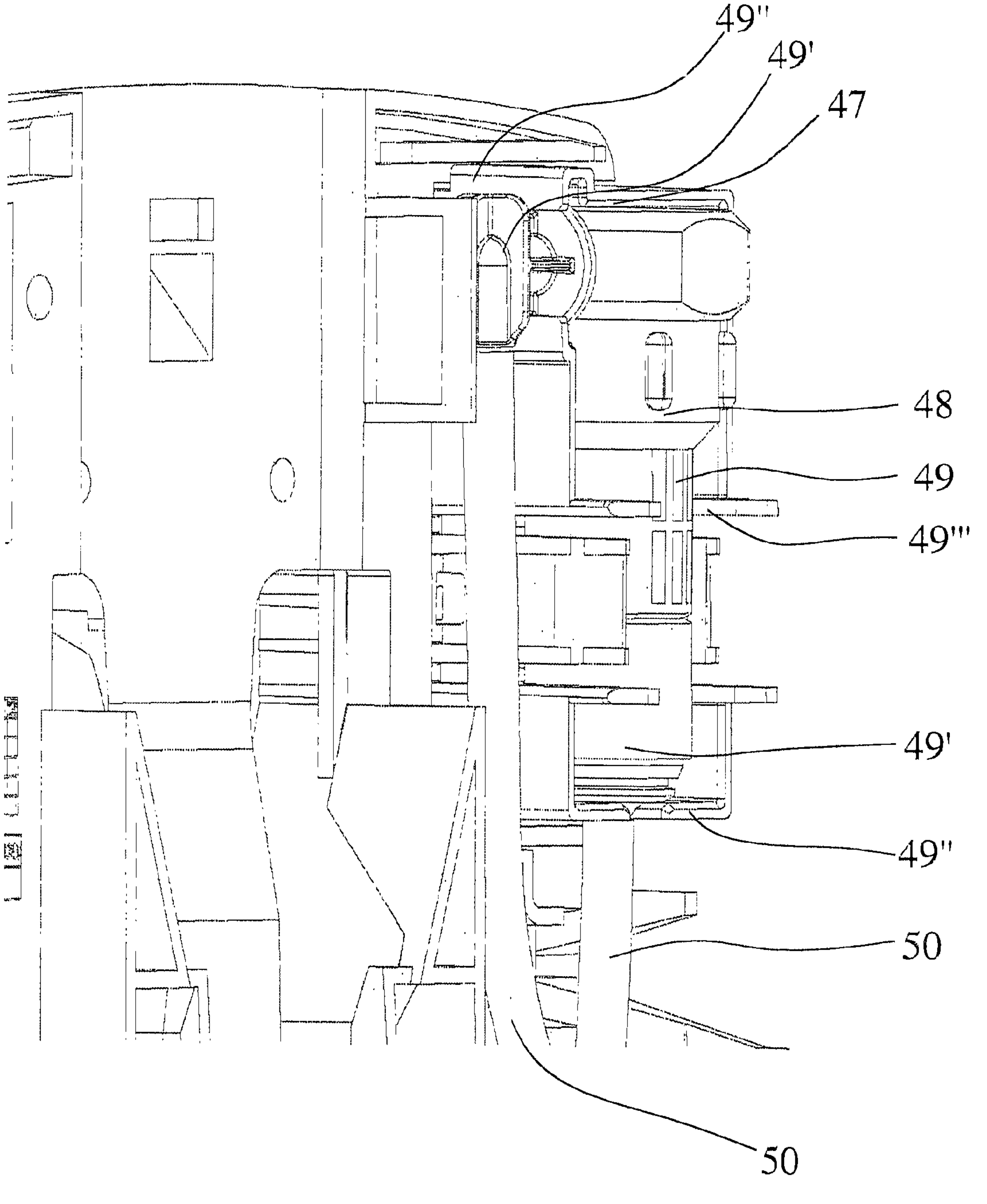

FIG. 15 shows an upper right area of the chassis of FIG. 13 with a backflow preventer mounted in its receptacle.

Figure 16:
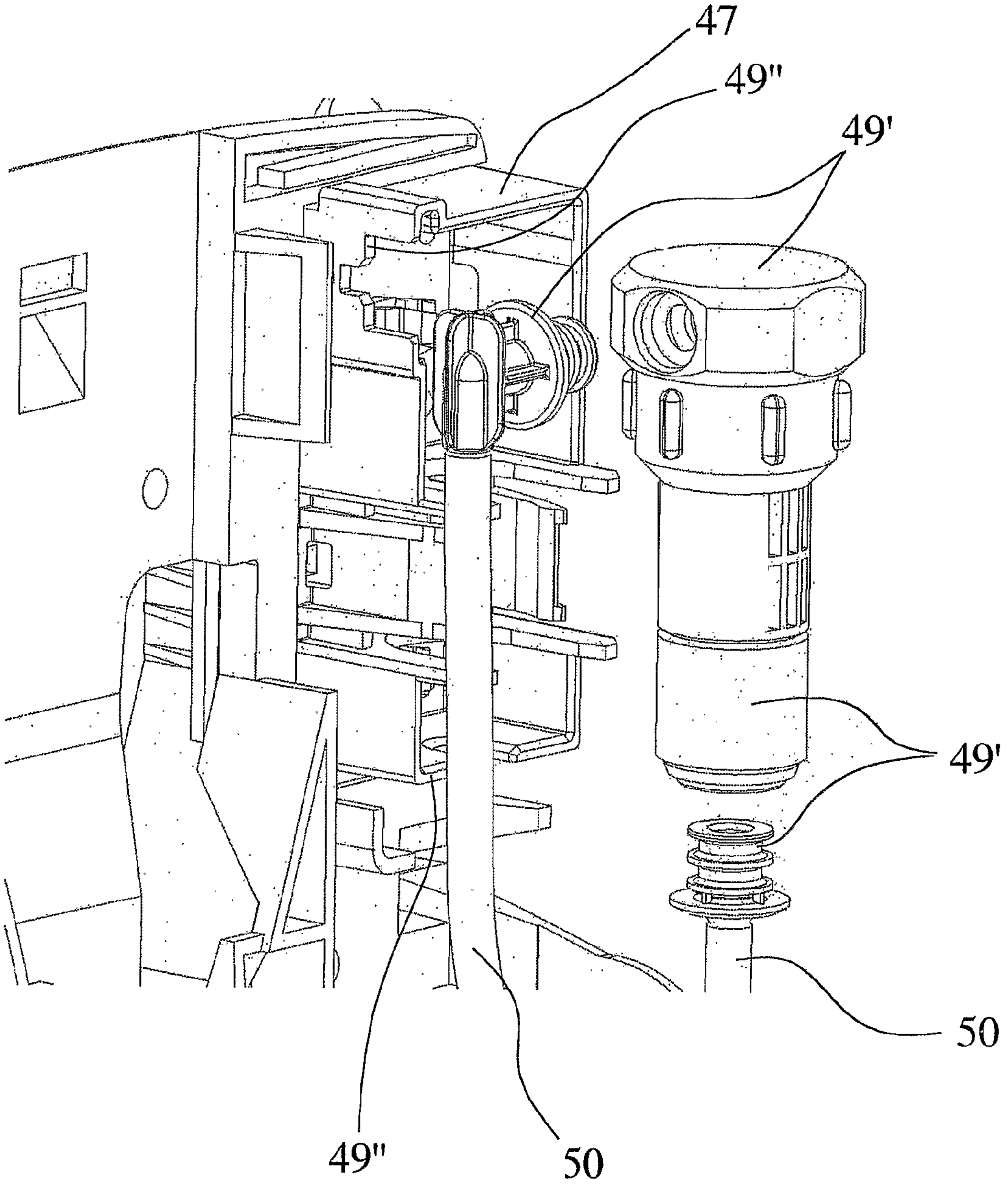

FIG. 16 shows an upper right area of the chassis of FIG. 13 with the backflow preventer removed from its receptacle.

The drawings show only by way of example and explaining a preferred embodiment of the invention a detergent dispenser for dosing a quantity of solid detergent by dissolving some of the solid detergent in a liquid solvent, in particular in cold or hot water, to form a detergent solution, and feeding the detergent solution then to a detergent outlet and, finally, to a utilization point. This utilization point may particularly be an industrial dish washing machine, but may be any other cleaning or even disinfecting equipment like laundry washing machine or cleaning equipment.

Figure 1:
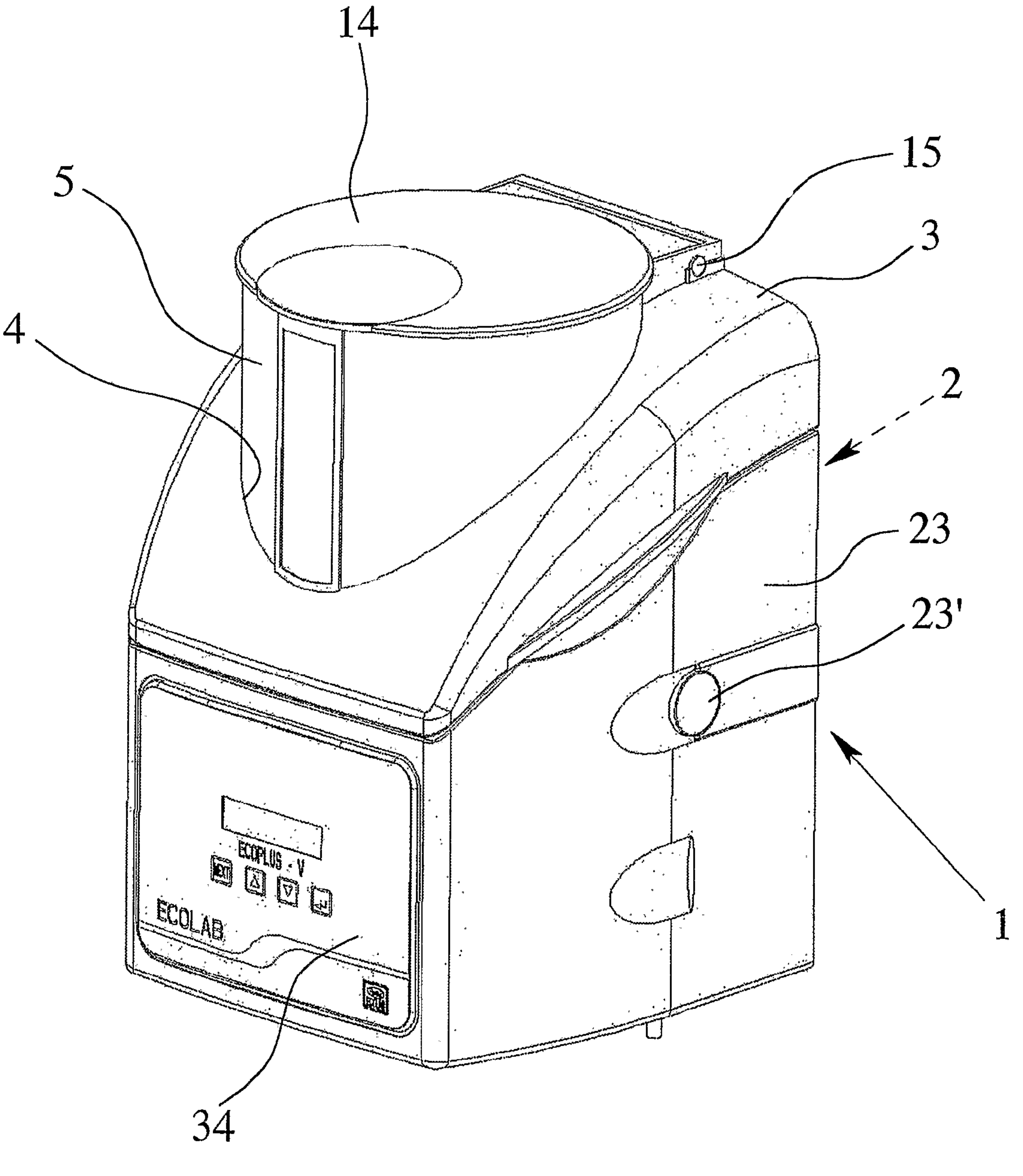
Figure 2:
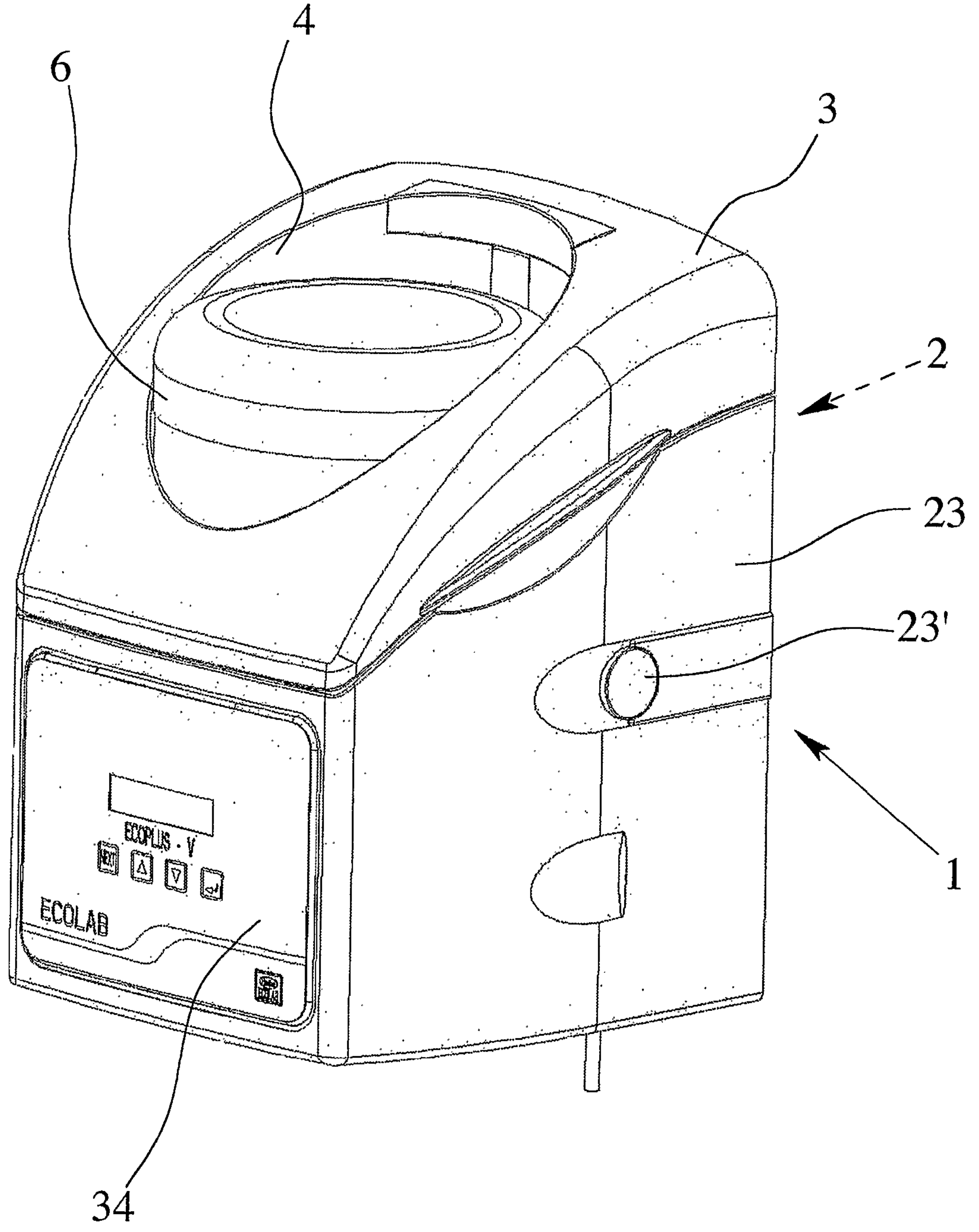

FIGS. 1 and 2 show two different embodiments of the detergent dispenser, in FIG. 1 a detergent dispenser for bulk material, namely detergent powder material, FIG. 2 instead for solid cast detergent material. From FIGS. 1 and 2 it can be obtained that the detergent dispenser as such is identical for both types of solid detergent, only the solid detergent reservoirs forming the top of the detergent dispenser housing are different.

A further and more detailed description shall now be given referring to FIGS. 1 to 6 together.

The detergent dispenser according to the invention shows a housing 1 with a chassis 2 for wall-mounting the detergent dispenser, or for any other mounting option. The dispenser further comprises a solid detergent reservoir 3. The solid detergent reservoir 3 comprises a detergent compartment 4 holding the solid detergent either in a container 5 for bulk material or, as an alternative, in a cartridge 6 as shown in FIG. 2 for a solid block-like material. A block-like solid detergent material is available also as cast material in a thin plastic covering or as an extruded material (geo-block) without any cover. Of course, the solid detergent reservoir 3 may be as well equipped with blades for opening a bag containing bulk material as in the prior art of EP 0 781 110 B1.

The solid detergent reservoir 3 further comprises a solvent application compartment 7 below the detergent compartment 4. In the present embodiment which can be seen in FIG. 5 and FIG. 6 the detergent compartment 4 and the solvent application compartment 7 are separated by a screen or sieve 8. However, if a solid block-like material or a specific container or cartridge is used this screen 8 may be removed.

At the solvent application compartment 7 a liquid solvent dispensing means 9 is provided in the form of a liquid spray nozzle. From this nozzle liquid solvent, namely here cold or hot water, can be sprayed towards the solid detergent within the detergent compartment 4 of the solid detergent reservoir 3 impinging upon substantially the entire lower surface area of the solid detergent and forming a detergent solution dripping off from this surface.

A solvent supply conduit 10 leads to the solvent dispensing means 9. A detergent solution collector means 11 in the form of a funnel can be seen at the bottom of the solvent application compartment 7, and a solution conduit 12 is connected to the solution collector means 11 to carry away the detergent solution dripping off from the solid detergent towards a detergent outlet 13.

Figure 4:
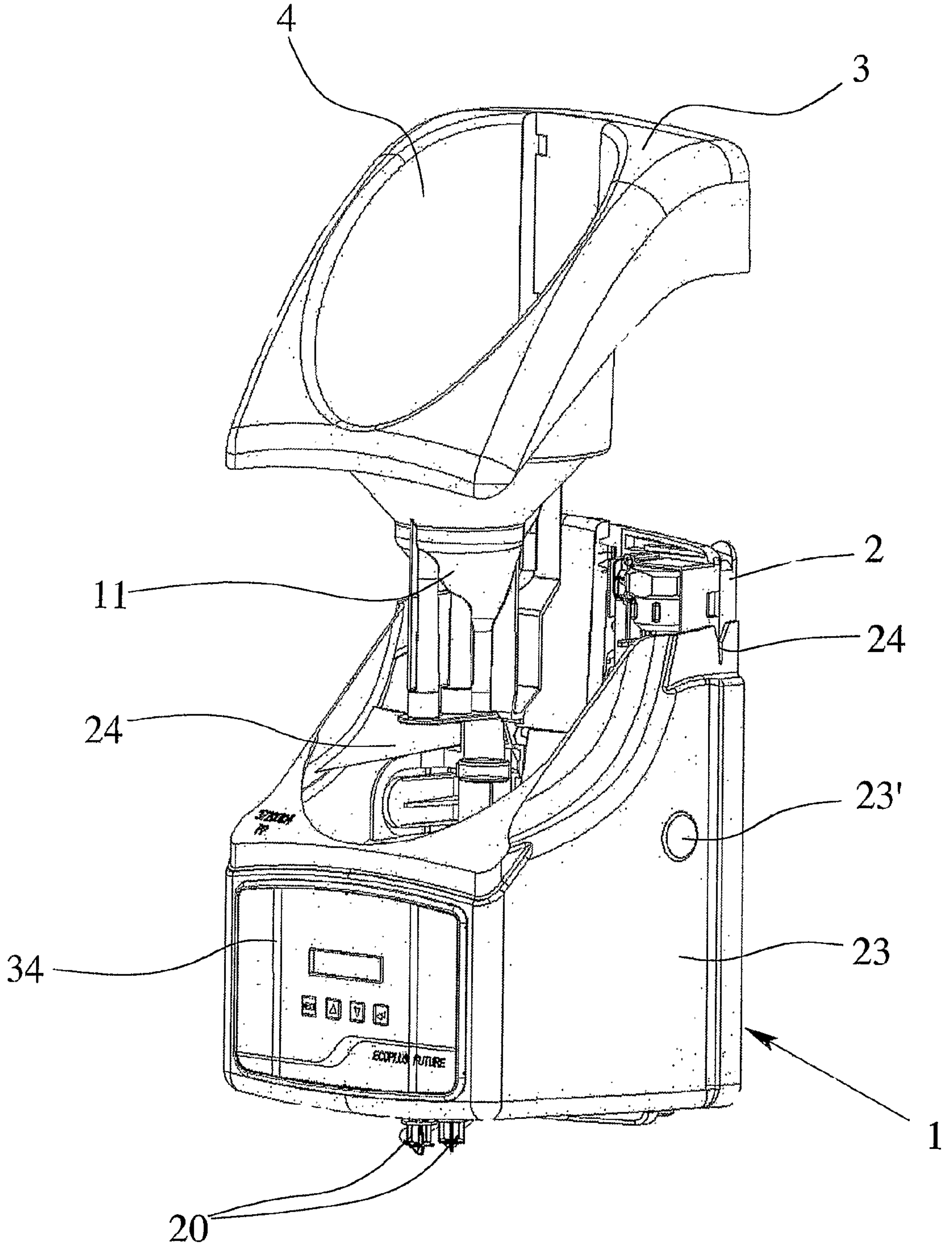
FIG. 4 shows in a perspective view the detergent dispenser of FIG. 3 with the detergent reservoir removed.

In the present embodiment, the solid detergent reservoir 3 is constructed as a modular unit easily separable from the housing 1. That can be obtained from a comparison of FIGS. 1, 2, 4. The solid detergent reservoir 3 can be simply lifted from the housing 1 as shown in FIG. 4, of course after disconnecting hydraulic connections that will be explained later, and perhaps after unlocking a concealed or obvious lock between reservoir 3 and housing 1.

If solid detergent reservoirs 3 for different types of solid detergent are provided they are different only in the detergent compartment 4 and, optionally, the solvent application compartment 7 and/or the liquid solvent dispensing means 9.

Otherwise those different solid detergent reservoir 3 are identical and in particular fully compatible with the housing 1 and the hydraulic connectors and all attachment points therein. The invention provides for a two-component system with the basic detergent dispenser without the solid detergent reservoir 3 being the same for all types of solid detergent whereas the solid detergent reservoir 3 being different as the occasion arises for different types of solid detergent, in particular different structure and shape of the solid detergent material.

This modular design reduces the stock keeping costs, because only the different detergent reservoirs 3 have to be kept in stock, whereas the same base unit can be used for all types of detergent dispensers. Further, flexibility for the customer is substantially increased, because just with an exchange of the solid detergent reservoir 3 he can use the option for a different type of solid detergent. Costs are substantially reduced, productivity increases.

Moreover, the modular design for the solid detergent reservoir and the fact that this modular unit is easily separable from the housing 1 means that the reservoir 3 as such may be positioned in a dish washing machine to be cleaned in a usual dish washing process.

Now, as can be seen in FIG. 2, the detergent compartment 4 for a block material or for a bulk material within a replaceable container 5 or cartridge 6 is open at the top and has, optionally, a cross-section adapted to the cross-section of the specific block, container 5 or cartridge 6.

In contrast, as can be seen in FIG. 1, in this embodiment the detergent compartment 4 of a solid detergent reservoir 3 for bulk material (powder, granulate or semi-solid material) comprises a container 5 with a lid 14 on top. Here, the lid 14 is hinged at a hinge 15 so that after casting the powder or granulate into the container 5 the container 5 can be closed. As an option, and to be explained later in detail, the lid 14 can be controlled by a safety switch switching off in particular the water supply as soon as the lid 14 is opened. This is a safety measure in particular for solid detergent in powder form.

Figure 5:
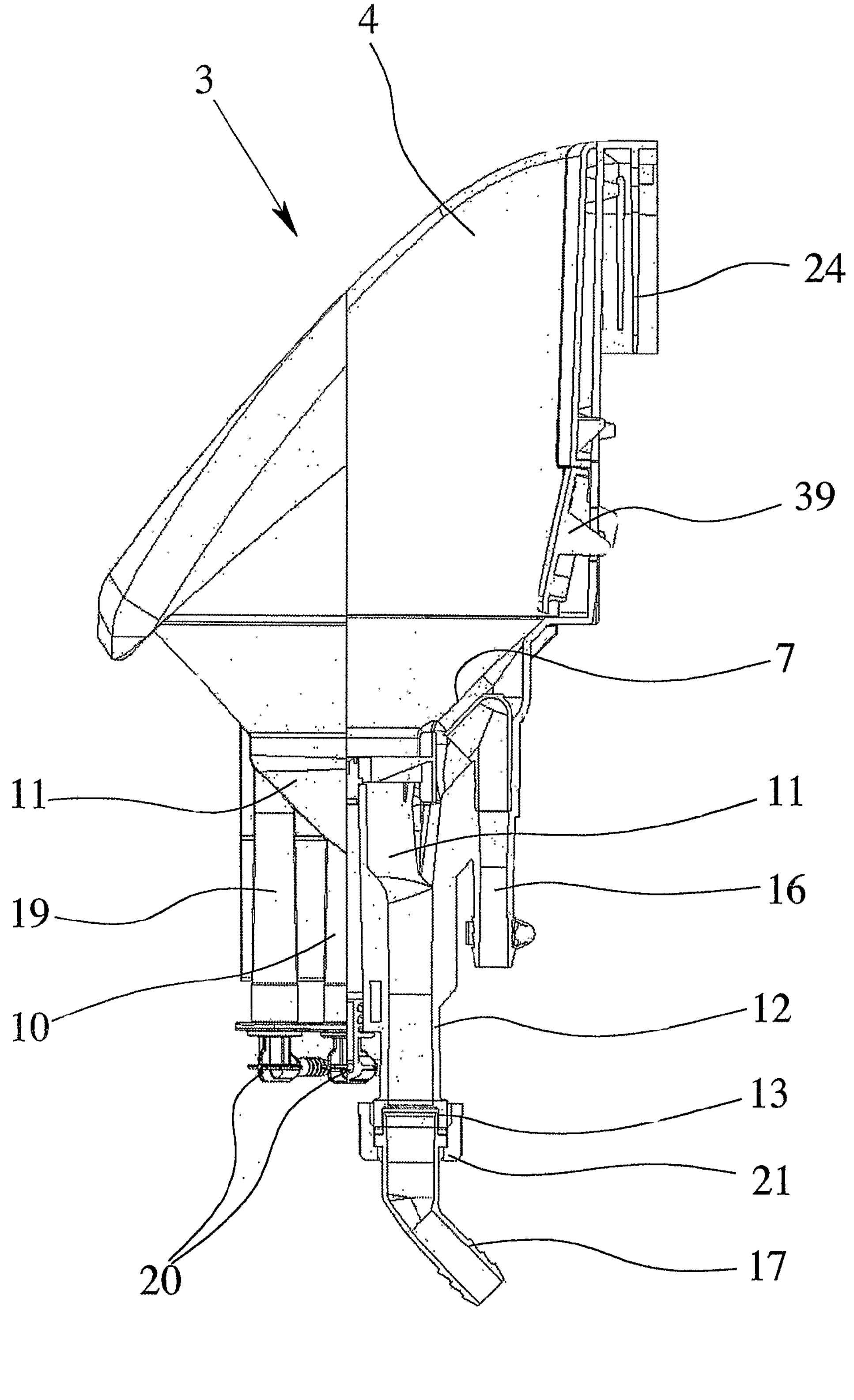
FIG. 5 shows in a side and partly sectional view a solid detergent reservoir of a detergent dispenser according to FIG. 4.

From FIG. 5 it can be obtained in a particularly clear manner that the detergent solution collector means 11 is provided with a spillover drain 16. This spillover drain 16 is a safety means.

Considering that the rear side on the right in FIGS. 1 to 6 will normally be mounted on a wall of a building it is helpful that in the present and preferred embodiment the solution conduit 12 is placed close to the rear of the housing 1 and/or the spillover drain 16 is placed close to the rear of the housing 1. It is possible to lead the product feed line 17 indicated in FIGS. 3, 5 and 6 towards the utilization point on the wall at least close to the wall with the result that damaging of this product feed line 17 will be prevented.

Figure 6:
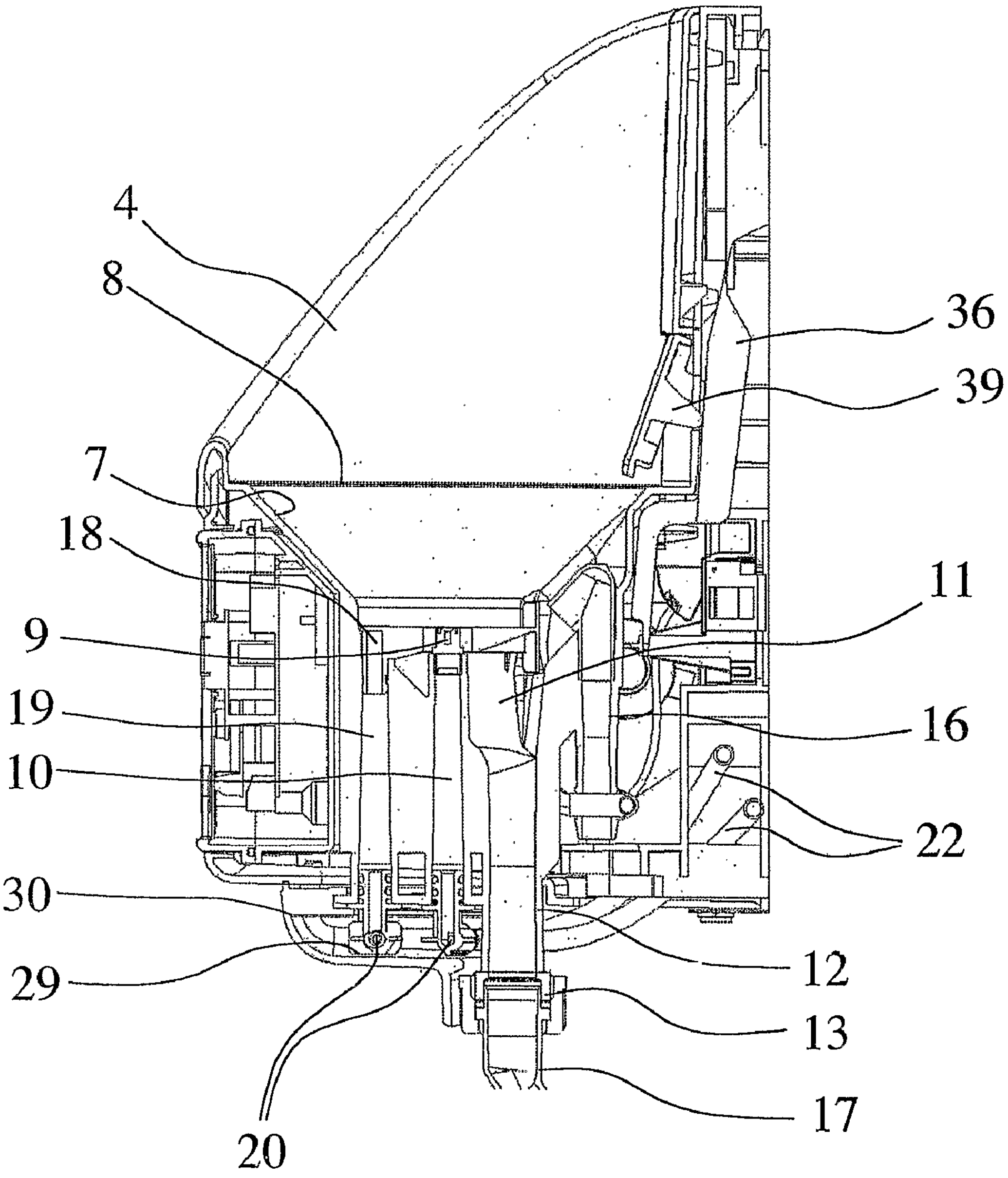
FIG. 6 shows a fall sectional view of a chassis of a detergent dispenser according to a preferred embodiment of the invention with the solid detergent reservoir but without a solid detergent cartridge or container therein.

Now, FIG. 4 to 6 show a specific embodiment which has an additional feature that can be provided as an option. Sometimes solid detergents have to be used that tend to clog the solution conduit 12 or the product feed line 17 at least if the detergent dispenser is not used for a considerable time period. Therefore it will be helpful to flush the complete system after the dosing of the detergent solution into the utilization point, in particular the dish washing machine, has been finished. If a detergent dispenser with this option is provided, the solid detergent reservoir 3 is provided with a second liquid solvent dispensing means 18 and a second solvent supply conduit 19 separate from the first one for flushing the solvent application compartment 7 in total or in part as well as the solution conduit 12 and a product feed line 17 with clean liquid solvent, in particular clean water, after a dispensing cycle. Of course, this second liquid solvent dispensing means 18, in particular for cold or, preferably, hot water, shall not spray the liquid towards the solid detergent but shall just flush the detergent solution collector means 11, the solution conduit 12 and the product feed line 17 eliminating the solid detergent residues.

As can be seen from the drawings FIG. 3 to 6 each solvent supply conduit 10, 19 and the solution conduit 12 are provided with a hydraulic connector 20; 21 for connecting it to a solvent supply line 22 and the product feed line 17. Each solvent supply line 22 with the connector 20 is fixedly arranged within the housing 1 leading from a water supply to the respective conduit 10, 19. The product feed line 17 with the hydraulic connector 21 is e.g. a quick-screw or a bayonet-connection.

Figure 7:
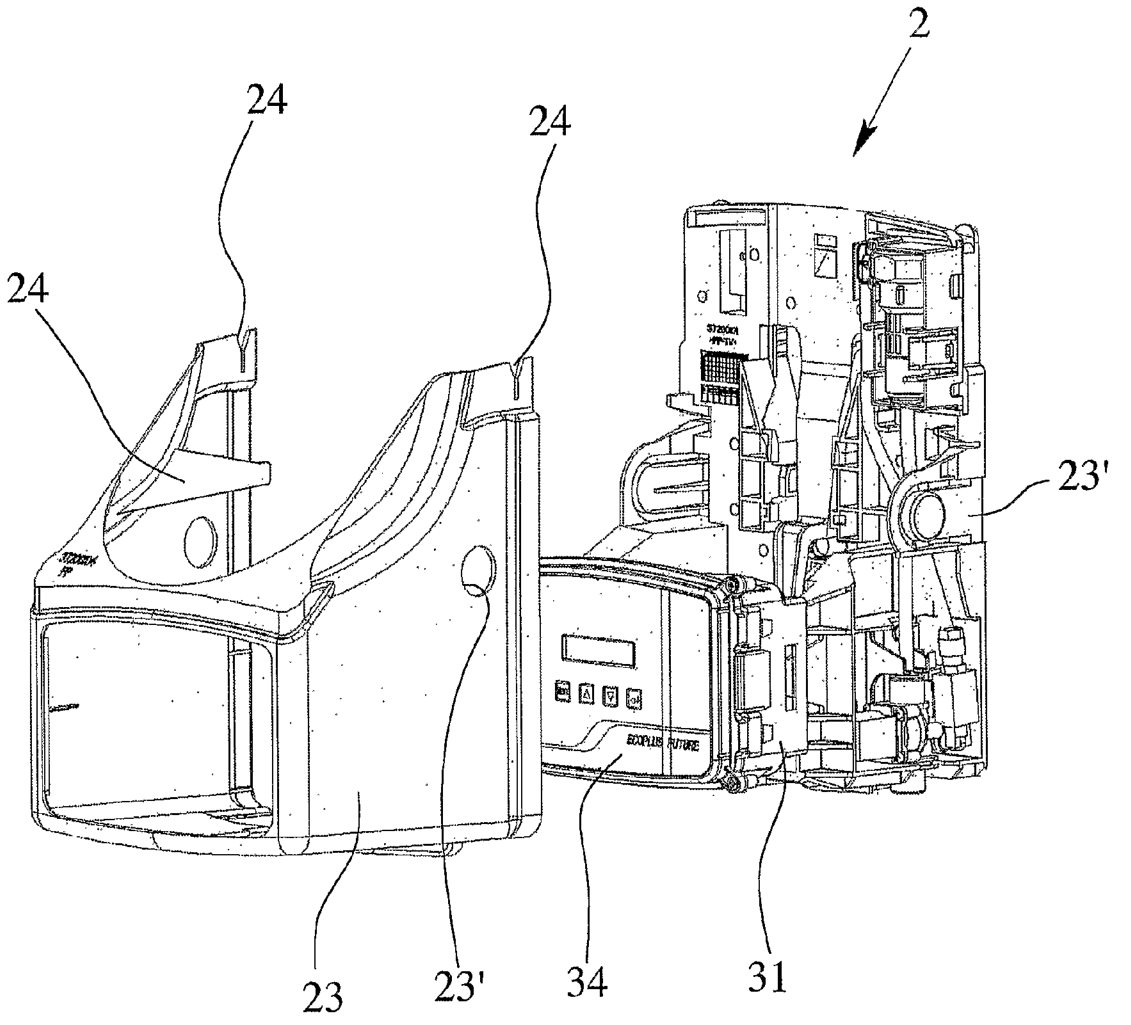
FIG. 7 shows a detergent dispenser according to the invention with the solid detergent reservoir removed and a front cover of the housing removed as well.

Now, FIG. 4 in combination with FIG. 7 shows a further embodiment of the invention in that the housing 1 comprises a front cover 23 connected to the chassis 2 by a snap-in connection 23' and/or a concealed keyless locking means. The concealed keyless locking means can be unlocked only by a person well acquainted with this system. It replaces a traditional key lock system and reduces costs once more.

From FIG. 4, FIG. 5 and FIG. 7 of the drawings a further specific feature of a preferred embodiment of the invention can be obtained. In order to prevent misuse of the inventive detergent dispenser it is provided here that the solid detergent reservoir 3 and the front cover 23 of the housing 1 are provided with interlocking means 24 adapted so that the front cover 23 can only be removed if the reservoir 3 has been separated from the chassis 2 before. In the present embodiment those interlocking means 24 are realized as tongue and groove connections and as blocking wings 24 on the front cover 22. Of course this is only a simple and cost-effective example thereof.

Up to now it has been explained how the solid detergent reservoir 3 is a modular unit easily separable from the housing 1 and how this solid detergent reservoir 3 is constructed in detail.

However, in a preferred embodiment of the invention which can be obtained from further Figures of the drawings, too, the dispenser in total is constructed to have mostly modular units. In particular it is preferred that most of or all of the modular units are connected to the chassis 2 and/or another modular unit by snap-in connectors or plug-in connectors. The specific snap-in connectors or plug-in connectors for the different modular units will be explained later in detail as the occasion arises.

Up to now only the snap-in connection 23' for the front cover 23 has been described. This has a finger tip pressure plate which can be pressed to release this connection 23' as can be seen from a comparison of FIG. 4 and FIG. 7.

Figure 8:
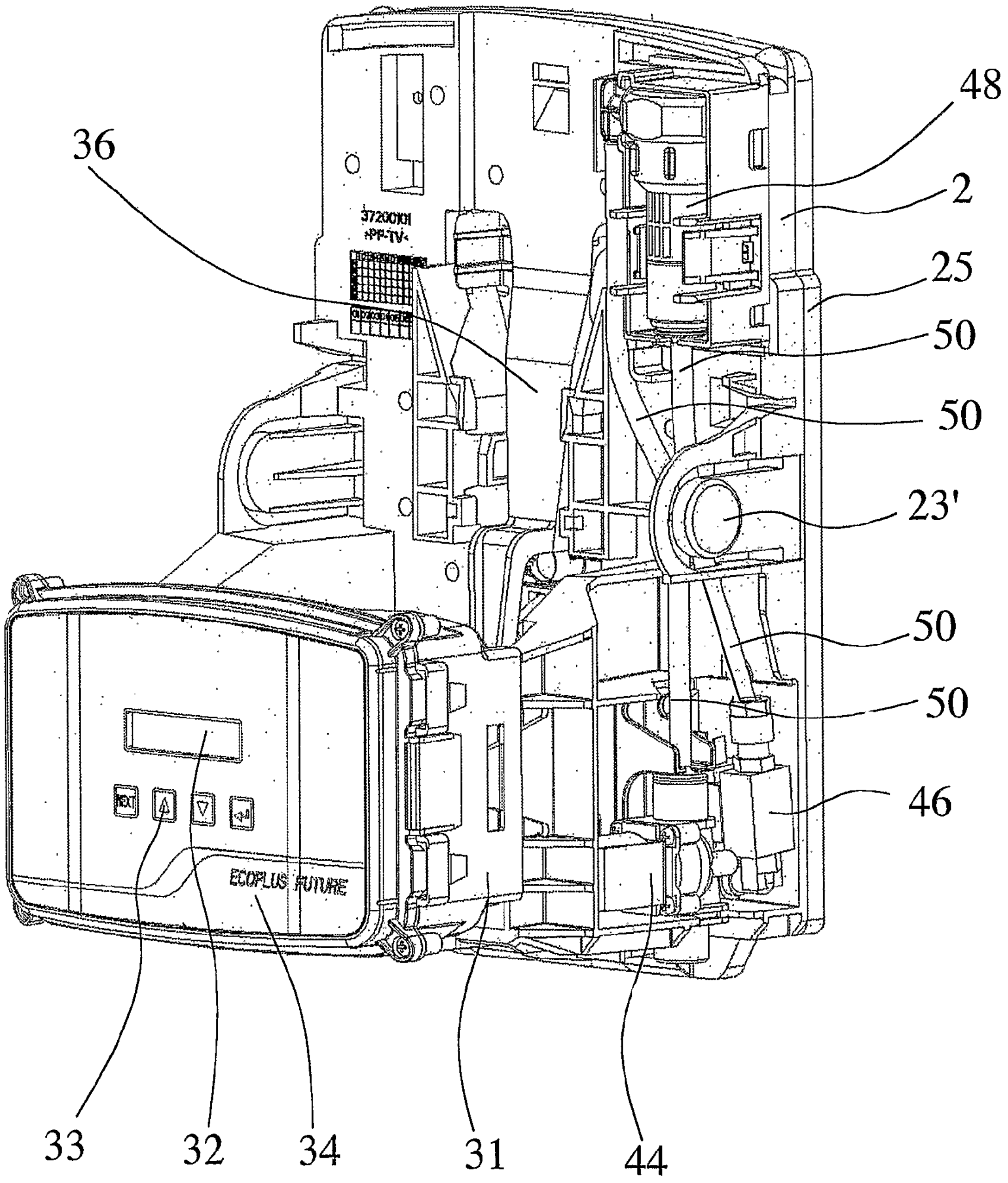
FIG. 8 shows the chassis of the detergent dispenser of FIG. 7 in an enlarged view.
Figure 9:
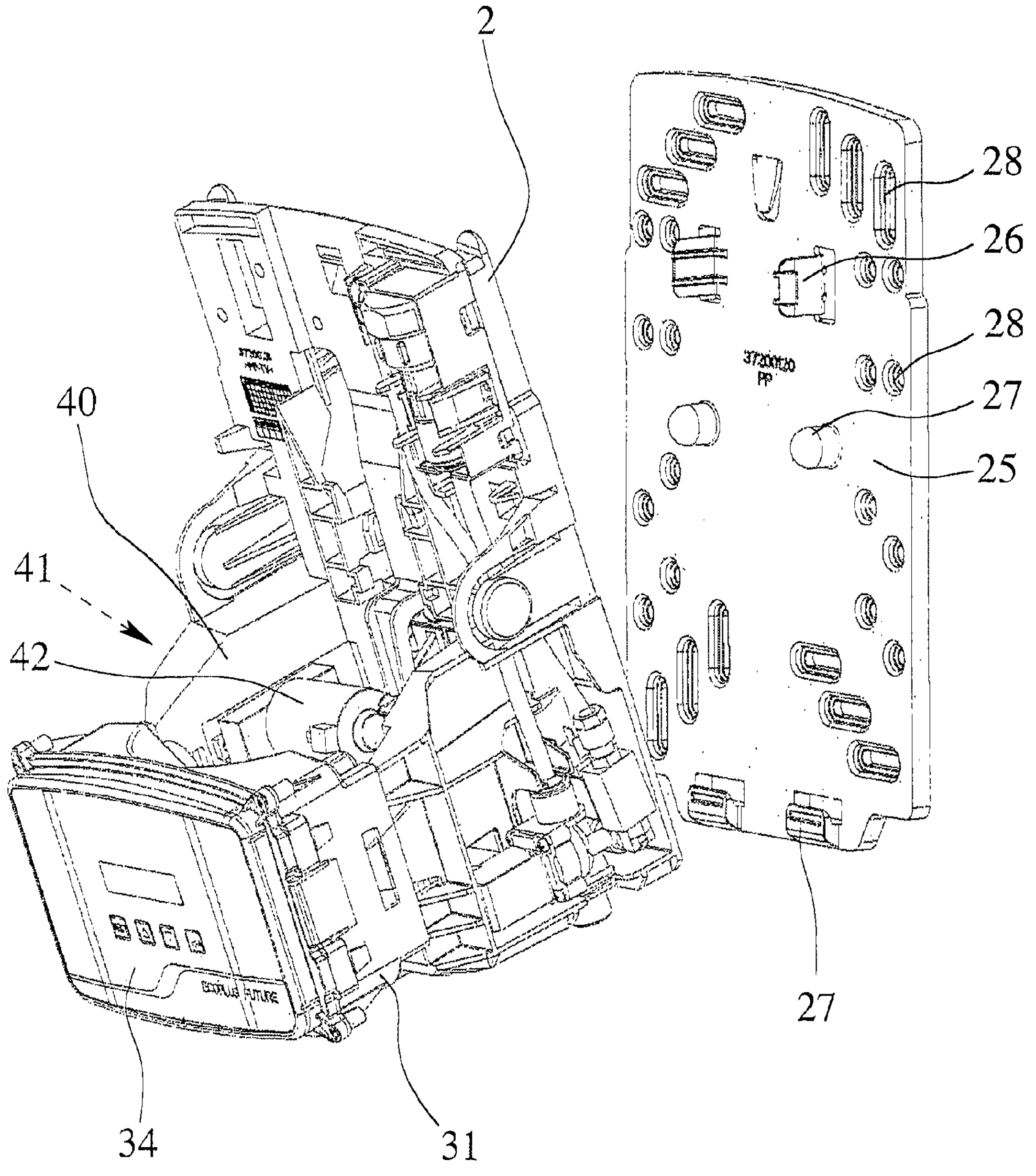
FIG. 9 shows the chassis of FIG. 8 intended to be mounted on a separate mounting plate.

Now, referring to FIGS. 8 and 9 of the drawing, a further interesting embodiment of the invention is to be described. Here it is provided that the chassis 2 is provided with a separate mounting plate 25 adapted for wall-mounting or the like, the chassis 2 as such being connected to the mounting plate 25 preferably by snap-in connections 26 and, preferably, pre-positioning formations 27. The optional mounting plate 25 shows a large number of through holes 28, some of those designed as oblong holes. With this kind of mounting plate 25 the detergent dispenser can be mounted at most different kinds of locations and can form a basis for the chassis 2 which is easily exchangeable. Mounting the detergent dispenser on a wall or the like can take place only with a mounting plate 25 without the necessity to hold and adjust the complete, heavy dispenser system. The pre-positioning formations 27 are helpful in this respect as well.

Figure 3:
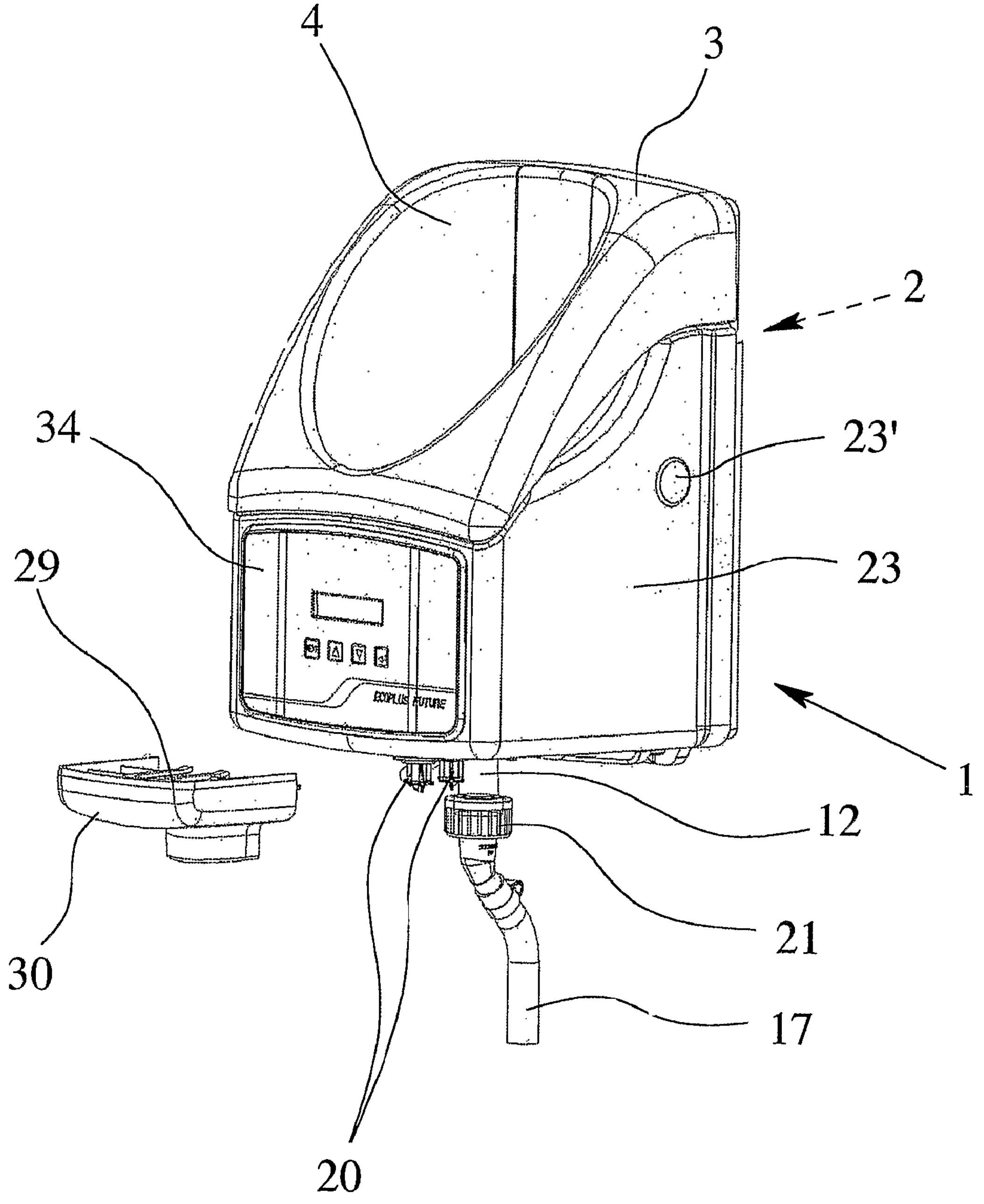
FIG. 3 shows a detergent dispenser according to the invention in a perspective view with an empty solid detergent reservoir.

Further simplification of mounting and dismounting the parts of the inventive detergent dispenser comes along with the further design option that most of or all of the hydraulic connectors are provided as plug-in connectors or snap-in connectors and are, preferably, locked by locking formations 29 on a respective modular unit or a separate locking part 30. In FIG. 3 it can be seen that the separate locking part 30 can be laterally pushed onto guide rails at the bottom of the housing 1 with locking formations 29 being formed by the locking part 30 preventing the plug-in hydraulic connectors 20 for the solvent supply conduit 10 and the second solvent supply conduit 19 from moving downwardly. When the locking part 30 is removed, as shown in FIG. 3, however, the hydraulic connectors can be easily pulled from the corresponding conduits 10; 19. So here we have on the one hand a simple mounting and dismounting feature, on the other hand a safe hydraulic connection once the locking part 30 is in place.

Similar systems will be found in other modular units of the detergent dispenser as will be explained later.

Now, in a further and preferred embodiment it is provided that an electronic control means is provided within an electronic modular unit 31. In the present embodiment the electronic modular unit may have a PC-board or a number of boards with or without a display. In the present embodiment there is a LCD-display 32 and operating keys in a front cover 34 which is snap-fitted to the base of the electronic modular unit 31 as can be seen in FIG. 10. The modular design of the detergent dispenser is intensified in this respect. The front cover 34 is as such covered by the front cover 23 of the housing 1 which as such again is interlocked with the reservoir 3. Thus the electronic modular unit 31 is safely positioned within the housing 1 protected from tampering.

As a further design feature of a preferred embodiment of the invention it is provided that most of or all of the electric and electronic items of the dispenser are positioned in or at the chassis 2, whereas only a few or none are provided in or at the solid detergent reservoir 3. In the embodiment of FIG. 2 none are provided in the reservoir 3. In the embodiment of FIG. 1, if there is a sensor for opening of the lid 14, only this sensor is position in the reservoir 3.

In order to further increase safety it may be provided that the electric/electronic system of the dispenser is a low voltage system, preferably with a power supply of 24 V or 12 V, with a mains supply to be positioned at a distance from the dispenser. In the preferred embodiment of the invention a power supply is provided with an external mains supply 240 V (AC)/24 V (AC) all in a housing fulfilling high water protection standards (e.g. IP 65). European standards will be observed, too.

Now, further reference is made to FIGS. 8 and 11 to 13 of the drawing. Another safety feature can be obtained from those drawings. Here it is provided that the chassis 2 is provided with a safety switching means 35 in order to switch off electricity and the liquid solvent supply as soon as the solid detergent reservoir 3 and/or a container 5, cartridge 6 or block of solid detergent is being removed from the chassis 2. This safety switching means 35 can be provided by specific electromechanical switches or by electronic sensors (proximity sensors or contact sensors or optical sensing means). In the present embodiment, however, an electro-mechanical system is used. Here it is provided that the safety switching means 35 is provided with a spring loaded lever 36 mounted on the chassis 2 and operable against the spring load by the solid detergent reservoir 3 when it is attached to the chassis 2. In particular, the spring loaded lever 36 of the safety switching means 35 as indicated in FIG. 11 and FIG. 12 cooperates with a electromechanical switch 37 equipped with a switching lever 38 that is operated by the spring loaded lever 36 (compare FIG. 11 and FIG. 12). However, the switch 37 can be a contactless switch, in particular an optical switch as well.

In order to provide a solution for this safety device that can be used with all kinds of solid detergent reservoirs 3 and solid detergent types, the present invention has a particular design. This is in the present and preferred embodiment provided in that the solid detergent reservoir 3 for block material or container/cartridge is provided with a follower lever 39 cooperating with the spring loaded lever 36 on the chassis 2 to release the spring loaded lever 36 to the "off"-position (FIG. 11) even if only the block or container/cartridge is missing from the solid detergent reservoir 3. Altogether, the spring loaded lever 36 of the safety switching means 35 in this embodiment operates the safety switch 37 into the "on"-position only if the solid detergent reservoir 3 with a filling of solid detergent either by container 5 or cartridge 6 or by a solid detergent block is present. Otherwise the water supply and preferably also electricity will be switched off.

Sometimes it may be necessary or helpful to provide the detergent dispenser with a separate pumping means. In order to have a dispenser for universal use the chassis 2 may be provided with a receptacle 40 for an optional provision of a separate pumping unit 41 driven by an electric drive motor 42. The reference numbers can be obtained from FIG. 9 and, in particular, from FIG. 13 showing the chassis 2 without the electronic modular unit 31. This receptacle 40 is particularly suitable for a peristaltic pump but may be provided for a different pump, for example a diaphragm pump also. FIG. 13 shows the electric drive motor 42 extending into a free space within the chassis 2 behind the electronic modular unit 31.

It can be provided that the pumping unit be part of the hydraulic system of the detergent dispenser as described before. However, for a dish washing system such pumping unit 41 will be used mainly for a liquid additive, in particular a liquid rinsing additive. This liquid additive normally has to be pumped to a different location at the utilization point. Therefore, in a preferred embodiment, it is provided that the pumping unit 41 is provided with separate hydraulic connectors for separate supply feed lines for pumping a liquid additive, in particular a liquid rinsing additive, to a utilization point.

Anyway, in the present embodiment the housing 1 of the detergent dispenser is prepared for the use of a separate pumping unit 41.

Now, FIG. 13 and following FIGS. 14 to 16 show further interesting details of a preferred embodiment of the invention. Details of the chassis can be obtained from those drawings.

First of all, in this preferred embodiment as disclosed in FIG. 13 and FIG. 14 the chassis 2 is provided with a receptacle 43 for a motorized liquid solvent supply valve 44. The supply valve 44 is held in the receptacle 43 by a plug-in connection 43' and/or, preferably, a snap-in connection. In the present embodiment the liquid solvent supply valve 44 is a 2/2-directional control valve operated by a motor so that it has a pretty slow moving valve body. This eliminates the risk for sharp pressure peaks in the water supply system. A solinoid-operated on/off-valve would be equally applicable, however that valve should also be equipped with some damping means.

In the present embodiment the receptacle is provided with a plug-in connection 43' and further with a, here concealed, snap-in connection. Moreover, a locking formation 44' on the chassis 2 secures the plug-in hydraulic connector 44" as soon as the supply valve 44 is positioned within the receptacle 43. This is a similar situation as with the locking part 30 relative to the hydraulic connectors 20 explained above.

At the lower end of the supply valve 44 a snap-in hose connector 44''' can be seen. This hose connector 44''' serves to connect a water mains supply line or hose to the detergent dispenser as such.

Of course, the supply valve 44 is controlled by the electronic modular unit 31 to open and close the liquid solvent supply following the operation requirements.

In FIG. 13 and FIG. 14 a further specific feature of the preferred embodiment described here can be seen. It is provided here that the chassis 2 is provided with a receptacle 45 for a motorized 3/2-directional control valve 46, wherein the 3/2-valve 46 positioned downstream of the supply valve 44 and serves to supply liquid solvent either to the liquid solvent dispensing means 9 or the second liquid solvent dispensing means 18. This further valve 46 is necessary only if a first solvent supply conduit 10 and a second solvent supply conduit 19 are provided. If the last-mentioned supply is not existent this valve is not necessary. This valve serves to divert the liquid solvent, in particular water, to the respective supply line.

International standards sometimes require that a backflow from the dispenser into the water mains be prevented. In a specific embodiment of the invention that is shown here there is provided that the chassis 2 is provided with a receptacle 47 for a backflow preventer 48, wherein the backflow preventer 48 is positioned downstream of the supply valve 44 and serves to prevent any backflow of liquid into an external liquid solvent supply line in case of a pressure drop in that external liquid solvent supply line (water mains). The backflow preventer 48 has release openings 49 that will be opened as soon as the pressure drop occurs so that only air is sucked into the water supply line but no chemicals my enter the line. Such backflow preventer 48 is disclosed in EP 0 781 110 B1 as well.

In the present embodiment the backflow preventer 48 is positioned downstream of the supply valve 44 but upstream of the directional control valve 46 that is optionally provided.

Here, again, from a comparison of FIG. 15 and FIG. 16 it can be seen that the hydraulic connectors 49' are simple plug-in connectors which are fixed in their operative position each by a corresponding locking formation 49'' on the receptacle 47. The backflow preventer 48 as such is fixed by a snap-in connection 49''' within the receptacle 47. Supply valves 44; 46 as well as backflow preventers 48 are hydraulic parts that exist as off-the-shelf-parts in different form and are offered by different suppliers.

Following a specific concept of the present invention that is independent of the basic concept explained in claim 1 it may be provided that the receptacle 43 for the supply valve 44 and/or the receptacle 45 for the directional control valve 46 and/or the receptacle 47 for the backflow preventer 48 is constructed as a modular unit easily separable from the chassis 2 or another modular unit, wherein the receptacles 43, 45; 47 for different types of valves or different types of backflow preventers are fully compatible with the chassis 2 or modular unit as far as form and attachment points are concerned. By this means the receptacle in question as such is a modular unit easily separable from the chassis 2 of the housing 1. If, for example, as different backflow preventer 48 shall be used, only the receptacle 47 has to be changed to adapt the system to the different shape of the new backflow preventer 38. The unit of receptacle 47 and backflow preventer 48 can then be replaced in the chassis 2.

In the present invention liquid solvent-conduits 50 are connecting the different parts of the liquid solvent supply system.

In the present embodiment it is provided that the modular receptacle unit 43; 45, 47 is connected to the chassis 2 or another modular unit by snap-in connectors.

Finally, it is a preferred option to provide the parts of the detergent dispenser according to the invention, in particular the chassis 2 and the other modular units, as plastic parts, preferably from polypropylene.

The inventive system has a reduced complexity due to the modular design. Total costs and service efforts are substantially reduced. Due to the modular design and the plug-in and snap-in connections all parts of the dispenser are easily exchangeable. Cleaning is simple and efficient, because each module can be cleaned as such. Stock management is simplified and costs are reduced. Recycling is easy, because plastic-, electronic- and metal parts can be easily separated due to the plug-in and snap-in connections. Product contact by the user is prevented.

The invention claimed is:

1. A detergent dispenser comprising:

a mounting plate, a chassis for wall-mounting, removeably connected to the mounting plate by a snap-in connection, a housing connected to the chassis by a snap-in connection, and a solid detergent reservoir removeably connected to the housing and the chassis and indirectly connected to the mounting plate via the connections between the solid detergent reservoir and the housing and chassis, the solid detergent reservoir comprising:

a detergent compartment holding the solid detergent, a solvent application compartment below the detergent compartment and in fluid communication with the detergent compartment, a liquid solvent dispenser at or in the solvent application compartment, a solvent supply conduit leading to the solvent dispenser, a detergent solution collector at the bottom of the solvent application compartment, and a solution conduit connected to the detergent solution collector to carry away the detergent solution towards a detergent outlet, at least two modular units that are directly connected to the chassis and indirectly connected to the mounting plate via the connection to the chassis, wherein the modular units are selected from a group consisting of an electronic control unit, a pumping unit, a motorized liquid solvent supply unit, and a blackflow preventer;

wherein the detergent compartment, the solvent application compartment, the liquid solvent dispenser, the solvent supply conduit, the detergent solution collector, and the solution conduit are connected with plug-in or snap-in connectors, wherein the solid detergent reservoir is interchangeable for different types of solid detergents selected from the group consisting of a packaged solid block, an unpackaged solid block, and a packaged powder;

wherein the solid detergent reservoir is configured such that it can be connected and disconnected from the chassis and housing without the use of tools; and wherein the snap-in connection between the housing and the chassis is configured such that the housing can be released from the chassis only after the detergent reservoir is disconnected from the housing and chassis.

2. The dispenser of claim 1, wherein the detergent compartment of the solid detergent reservoir for a block material is open at the top.

3. The dispenser of claim 1, wherein the detergent compartment of a solid detergent reservoir for bulk material comprises a container with a lid on top.

4. The dispenser of claim 1, the detergent solution collector further comprising a spillover drain.

5. The dispenser of claim 1 wherein the solution conduit is placed close to the rear of the housing.

6. The dispenser of claim 1, the solid detergent reservoir further comprising a second liquid solvent dispenser and a second solvent supply conduit for flushing the solvent application compartment and the solution conduit with clean liquid solvent after a dispensing cycle.

7. The dispenser of claim 1, the solvent supply conduit and the solution conduit further comprising a hydraulic connector.

8. The dispenser of claim 1, the housing further comprising a front cover connected to the chassis by a snap-in connection or a concealed releasable keyless locking mechanism.

9. The dispenser of claim 8, wherein the solid detergent reservoir and the front cover of the housing are provided with interlocking connections adapted so that the front cover can only be removed if the reservoir has been separated from the chassis first.

10. The dispenser of claim 1, wherein the majority of the dispenser is constructed with modular units.

11. The dispenser of claim 10 wherein the modular units are connected to the chassis or another modular unit by snap-in connectors or plug-in connectors.

12. The dispenser of claim 1, wherein the electronic modular unit uses a low voltage a power supply of 24 V or 12 V, with a mains supply to be positioned at a distance from the dispenser.

13. The dispenser of claim 1, the chassis further comprising a safety switch in order to switch off electricity and the liquid solvent supply as soon as the solid detergent reservoir or a container, cartridge, or detergent is removed from the solid detergent reservoir.

14. The dispenser of claim 13, the safety switch further comprising a spring loaded lever mounted on the chassis and operable against the spring load by the solid detergent reservoir when it is attached to the chassis.

15. The dispenser of claim 14, the solid detergent reservoir further comprising a follower lever cooperating with the spring loaded lever on the chassis to release the spring loaded lever to the “off” position even if only the solid detergent is missing from the solid detergent reservoir.

16. The dispenser of claim 1, the chassis further comprising a receptacle for a separate pumping unit driven by an electric drive motor.

17. The dispenser of claim 16, wherein the pumping unit is provided with separate hydraulic connectors.

18. The dispenser of claim 1, wherein the chassis is provided with a receptacle for a motorized liquid solvent supply valve and the supply valve is held in the receptacle by a plug-in connection a snap-in connection.

19. The dispenser of claim 1, the chassis further comprising a receptacle for a motorized 3/2-directional control valve.

20. The dispenser of claim 1, the chassis further comprising a receptacle for a backflow preventer.

21. The dispenser of claim 1, wherein the mounting plate, chassis, housing, and solid detergent reservoir are made from plastic material.

22. The dispenser of claim 1, further comprising a locking part that laterally engages guide rails on the housing, wherein the locking part is configured to prevent the connectors from moving downwards away from the housing when the locking part is secured in place on the housing.

* * * * *